United States Patent
Banfield et al.

(10) Patent No.: US 12,367,233 B2
(45) Date of Patent: Jul. 22, 2025

(54) DETERMINING 3D MODELS CORRESPONDING TO AN IMAGE

(71) Applicant: Trimble Inc., Westminster, CO (US)

(72) Inventors: Robert Banfield, Riverview, FL (US); Aristodimos Komninos, Athens (GR); Jacques Harvent, Le Pereux-sur-Marne (FR); Michael Tadros, Boulder, CO (US); Karolina Torttila, Helsinki (FI)

(73) Assignee: Trimble Inc., Westminster, CO (US)

( * ) Notice: Subject to any disclaimer, the term of this patent is extended or adjusted under 35 U.S.C. 154(b) by 0 days.

(21) Appl. No.: 18/233,181

(22) Filed: Aug. 11, 2023

(65) Prior Publication Data

US 2024/0104132 A1 Mar. 28, 2024

(51) Int. Cl.
| | | |
|---|---|---|
| G06F 16/00 | (2019.01) | |
| G06F 16/532 | (2019.01) | |
| G06F 16/538 | (2019.01) | |
| G06F 16/56 | (2019.01) | |
| G06T 15/10 | (2011.01) | |
| G06T 17/00 | (2006.01) | |

(52) U.S. Cl.
CPC .......... *G06F 16/532* (2019.01); *G06F 16/538* (2019.01); *G06F 16/56* (2019.01); *G06T 15/10* (2013.01); *G06T 17/00* (2013.01)

(58) Field of Classification Search
CPC ...... G06F 16/532; G06F 16/538; G06F 16/56; G06T 15/10; G06T 17/00
See application file for complete search history.

(56) References Cited

U.S. PATENT DOCUMENTS

| | | | | |
|---|---|---|---|---|
| 2019/0147221 A1* | 5/2019 | Grabner | .......... | G06T 7/75 382/103 |
| 2021/0243362 A1* | 8/2021 | Castillo | .......... | H04N 23/61 |
| 2024/0054731 A1* | 2/2024 | Wolke | .......... | G06T 7/75 |

OTHER PUBLICATIONS

Extended European Search Report for Application No. 23198733.0-1203, mailed Jan. 23, 2024, 9 pages.
Singh, A. et al., "Scatternet Hybrid Deep Learning (SHDL) Network for Object Classification," 2017 IEEE International Workshop on Machine Learning for Signal Processing, Sep. 25-28, 2017, Tokyo, Japan, 6 pages.

\* cited by examiner

*Primary Examiner* — Paul Kim
(74) *Attorney, Agent, or Firm* — Kilpatrick Townsend & Stockton LLP (57) ABSTRACT

One or more three-dimensional models that corresponds to at least one two-dimensional image are determined by receiving image data that corresponds to the at least one two-dimensional image, generating features based on the image data corresponding to the at least one two-dimensional image, generating a representation vector for the at least one two-dimensional image by transforming the features into a predetermined amount of numerical representations corresponding to the features, and outputting the representation vector for the at least one two-dimensional image to facilitate a search query for the one or more three-dimensional models associated with the at least one two-dimensional image.

20 Claims, 6 Drawing Sheets

DETERMINING 3D MODELS CORRESPONDING TO AN IMAGE

CROSS-REFERENCE TO RELATED APPLICATIONS

The present application claims priority to Greek Patent Application Nos. 20220100779, filed Sep. 23, 2022, and 20220100886, filed Nov. 2, 2022, the entire contents of which are incorporated herein by reference for all purposes.

BACKGROUND

This disclosure relates in general to search querying and determining a similarity between assets with different dimensions. Models, such as three-dimensional models, computer aided design (CAD) models, other assets, and the like, can be generated on-the-fly, generated and stored (e.g., in a database), etc. Various terms and/or words can be associated with the models and can be used to identify the models via a search query. But, the terms and/or words may not be known by an entity, such as a user of a computing device or a pre-programmed algorithm, interested in identifying the models. For example, the entity may use different terms (e.g., compared to an entity that generated the particular model) and/or words to describe a particular model, may use a different language (e.g., compared to the entity that generated the particular model) to attempt to identify the particular model, or the like. Thus, searching for models using terms and/or words may not yield adequate results or any useful results.

SUMMARY

This disclosure relates to querying a three-dimensional model, and without limitation to identifying a three-dimensional model that corresponds to an image using hybrid machine-learning. The image may include a two-dimensional image that can be received by a hybrid machine-learning model, that can be derived from image data provided to the hybrid machine-learning model, that can be derived from a snapshot of a three-dimensional model, or the like. The hybrid machine-learning model can use various types of machine-learning layers. For example, the hybrid machine-learning model can include one or more layers trained via supervised learning, at least one layer trained via unsupervised learning, and the like. The supervised learning layers of the hybrid machine-learning model may generate features based on the two-dimensional image, and the unsupervised learning layer can project the features into multiple dimensions to generate a representation vector that represents the two-dimensional image. For example, the representation vector can include an N-dimensional numerical representation of the two-dimensional image. The representation vector can be used to identify a particular three-dimensional model. For example, a computing device can generate, using the hybrid machine-learning model, the representation vector for the two-dimensional image and can generate, using the representation vector, and submit a query to search for the particular three-dimensional model, which may be similar to the two-dimensional image.

In certain embodiments, a method for searching for three-dimensional models comprises: receiving, by a computing device, image data that corresponds to at least one two-dimensional image; generating, by the computing device and using supervised layers of a hybrid machine-learning model, features based on the image data corresponding the at least one two-dimensional image; generating, by the computing device and by using an unsupervised layer of the hybrid machine-learning model, a representation vector for the at least one two-dimensional image by transforming the features into a predetermined amount of numerical representations corresponding to the features; and outputting, by the computing device, the representation vector for the at least one two-dimensional image to facilitate a search query for one or more three-dimensional models associated with the at least one two-dimensional image.

In an embodiment, the method also includes receiving, by the computing device, model data that includes data representing a set of three-dimensional models; and generating, by the computing device, a set of second representation vectors, for each three-dimensional model included in the set of three-dimensional models: generating, by the computing device, a two-dimensional snapshot based on a particular view of the three-dimensional model; generating, by the computing device and using the supervised layers of the hybrid machine-learning model, features corresponding to a subset of the model data, wherein the subset corresponds to the two-dimensional snapshot; and generating, by the computing device and using the unsupervised layer of the hybrid machine-learning model, a second representation vector based on the features corresponding to the subset of the model data, wherein the second representation vector represents the two-dimensional snapshot. Each second representation vector of the set of second representation vectors may be stored in a model query data store. Some embodiments may include receiving the image data comprises receiving, by the computing device, a model search query that indicates that an entity is searching for a three-dimensional model based on the at least one two-dimensional image; and outputting the representation vector comprises comparing, by the computing device and in response to receiving the model search query, the representation vector to each second representation vector of the set of second representation vectors stored in the model query data store. Some embodiments may also include determining, by the computing device and based on comparing the representation vector to each second representation vector, that a particular second representation vector of the set of second representation vectors is most similar to the representation vector; and outputting, by the computing device, a particular three-dimensional model of the one or more three-dimensional models, wherein the particular second representation vector corresponds to the particular three-dimensional model.

In another embodiment, receiving the image data includes receiving, by the computing device, a three-dimensional model; and generating, by the computing device, the at least one two-dimensional image based on the three-dimensional model. Generating the at least one two-dimensional image may comprise generating, by the computing device, the at least one two-dimensional image by extracting the image data from a two-dimensional snapshot of the three-dimensional model. Some embodiments may include determining, by the computing device and based on comparing the representation vector to each second representation vector of a set of second representation vectors corresponding to the one or more three-dimensional models, that a particular second representation vector of the set of second representation vectors is most similar to the representation vector; and outputting, by the computing device, a particular three-dimensional model of the one or more three-dimensional models, wherein the particular second representation vector corresponds to the particular three-dimensional model. Generating the at least one two-dimensional image, determining that the particular second representation vector of the set of second representation vectors is most similar to the representation vector, and outputting the particular three-dimensional model may be performed substantially contemporaneously.

In certain embodiments, a system for searching for three-dimensional models comprises: a processing device; and a non-transitory computer-readable medium comprising instructions executable by the processing device to cause the processing device to perform operations comprising: receiving image data that corresponds to at least one two-dimensional image; generating, using supervised layers of a hybrid machine-learning model, features based on the image data corresponding the at least one two-dimensional image; generating, by using an unsupervised layer of the hybrid machine-learning model, a representation vector for the at least one two-dimensional image by transforming the features into a predetermined amount of numerical representations corresponding to the features; and outputting the representation vector for the at least one two-dimensional image to facilitate a search query for one or more three-dimensional models associated with the at least one two-dimensional image.

In an embodiment, the operation of receiving the image data includes: receiving a three-dimensional model; and generating the at least one two-dimensional image based on the three-dimensional model. The operation of generating the at least one two-dimensional image may comprise generating the at least one two-dimensional image by extracting the image data from a two-dimensional snapshot of the three-dimensional model. In some embodiments, the operation of receiving the image data comprises receiving a model search query that indicates that an entity is searching for the three-dimensional model; and the operation of outputting the representation vector comprises comparing, in response to receiving the model search query, the representation vector to each second representation vector of a set of second representation vectors corresponding to a set of three-dimensional models. The operations may also comprise receiving model data that includes the set of three-dimensional models; and generating the set of second representation vectors. The set of second representation vectors may be generated by, for each three-dimensional model included in the set of three-dimensional models: generating a two-dimensional image based on a particular view of the three-dimensional model; generating, using the supervised layers of the hybrid machine-learning model, features corresponding to a subset of the model data corresponding to the two-dimensional image; and generating, using the unsupervised layer of the hybrid machine-learning model, a second corresponding representation vector based on the features corresponding to the subset of the model data, wherein the second corresponding representation vector represents the two-dimensional image. Each second representation vector of the set of second representation vectors may be stored in a model query data store. In some embodiments, the operations may also comprise determining, based on comparing the representation vector to each second representation vector of the set of second representation vectors, that a particular second representation vector of the set of second representation vectors is most similar to the representation vector; and outputting a particular three-dimensional model of the one or more three-dimensional models, wherein the particular second representation vector corresponds to the particular three-dimensional model. The operation of generating the at least one two-dimensional image, the operation of determining that the particular second representation vector of the set of second representation vectors is most similar to the representation vector, and the operation of outputting the particular three-dimensional model may be performed substantially contemporaneously.

In certain embodiments, a non-transitory computer-readable medium comprises instructions executable by a processing device for causing the processing device to perform various operations relating to searching for three-dimensional models. The operations can include receiving image data that corresponds to at least one two-dimensional image; generating, using supervised layers of a hybrid machine-learning model, features based on the image data corresponding the at least one two-dimensional image; generating, by using an unsupervised layer of the hybrid machine-learning model, a representation vector for the at least one two-dimensional image by transforming the features into a predetermined amount of numerical representations corresponding to the features; and outputting the representation vector for the at least one two-dimensional image to facilitate a search query for one or more three-dimensional models associated with the at least one two-dimensional image.

In an embodiment, the operations also include receiving model data that includes data representing a set of three-dimensional models; and generating a set of second representation vectors. The set of second representation vectors may be generated by, for each three-dimensional model included in the set of three-dimensional models: generating a two-dimensional snapshot based on a particular view of the three-dimensional model; generating, using the supervised layers of the hybrid machine-learning model, features corresponding to a subset of the model data, wherein the subset corresponds to the two-dimensional snapshot; and generating, using the unsupervised layer of the hybrid machine-learning model, a second representation vector based on the features corresponding to the subset of the model data, wherein the second representation vector represents the two-dimensional snapshot. Each second representation vector of the set of second representation vectors may be stored in a model query data store. The operation of receiving the image data may comprise receiving a model search query that indicates that an entity is searching for a three-dimensional model based on the at least one two-dimensional image; and the operation of outputting the representation vector may comprise comparing, in response to receiving the model search query, the representation vector to each second representation vector of the set of second representation vectors stored in the model query data store. In some embodiments, the operations also include determining, based on comparing the representation vector to each second representation vector, that a particular second representation vector of the set of second representation vectors is most similar to the representation vector; and outputting a particular three-dimensional model of the one or more three-dimensional models, wherein the particular second representation vector corresponds to the particular three-dimensional model.

In another embodiment, the operation of receiving the image data includes receiving a three-dimensional model; and generating the at least one two-dimensional image based on the three-dimensional model.

In yet another embodiment, the operation of generating the at least one two-dimensional image comprises generating the at least one two-dimensional image by extracting the image data from a two-dimensional rendering of a three-dimensional model, and the operations further comprise:

determining, based on comparing the representation vector to each second representation vector of a set of second representation vectors corresponding to the one or more three-dimensional models, that a particular second representation vector of the set of second representation vectors is most similar to the representation vector; and outputting a particular three-dimensional model of the one or more three-dimensional models, wherein the particular second representation vector corresponds to the particular three-dimensional model.

Further areas of applicability of the present disclosure will become apparent from the detailed description provided hereinafter. It should be understood that the detailed description and specific examples, while indicating various embodiments, are intended for purposes of illustration only and are not intended to limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

This disclosure, without limitation, relates to identifying a model using hybrid machine-learning and an image as input. The model may include a three-dimensional model such as a computer-aided design (CAD) model or other suitable type of three-dimensional asset. The image may include a two-dimensional image such as a .PNG file, a JPEG file, a snapshot of a three-dimensional asset, or any other type of image that can be input into a hybrid machine-learning model. As an example, in some embodiments the image may be generated using a text description and diffusion model such as DALL-E, Imagen, or Stable Diffusion. The hybrid machine-learning model may include various layers such as convolution layers, transformation layers, pooling layers, and the like. For example, the hybrid machine-learning model can include one or more layers (supervised layers) trained via supervised training, at least one layer (unsupervised layer) trained via unsupervised training techniques, and the like. The hybrid machine-learning model can receive the image as an input and can generate, or facilitate generation of, a query to identify, among a set of assets, a three-dimensional model that is most similar to the input image.

In some embodiments, the supervised layers of the hybrid machine-learning model are similar or identical to one or more layers of an image-classification convolutional neural network. The supervised layers of the hybrid machine-learning model may include one or more convolutional layers, pooling layers, and/or other suitable machine-learning layers that can, in combination, ingest the input image and generate features corresponding to the input image. In one example, the supervised layers can include an ingestion layer that receives the input image and a set of convolutional layers that generates a set of features corresponding to the input image, though other examples of architecture of the supervised layers are possible.

The features can be projected into multiple dimensions by the hybrid machine-learning model. For example, the unsupervised layer projects the features into N dimensions by performing various mathematical operations. In one such example, the unsupervised layer can receive the features generated by the supervised layers and can use the features to generate a representation vector. The representation vector can include an N×1 matrix, where N corresponds to the number of dimensions to which the features are projected by the unsupervised layer. In some embodiments, the representation vector is an N-dimensional vector that includes N numerical values corresponding to the features of the input image and generated by the supervised layers.

The representation vector may represent the input image. For example, the representation vector can be used to identify the input image, to search for three-dimensional models that are similar or identical to the input image, and the like. The representation vector can be used, for example by the hybrid machine-learning model, the computing device that includes or executes the hybrid machine-learning model, other suitable computing devices, etc., to generate and submit a query for identifying three-dimensional models similar or otherwise corresponding to the input image. For example, the hybrid machine-learning model can generate and output the representation vector for the input image, and a computing device can generate a model-search query using the representation vector. The model-search query can be used to query an existing database that includes previously generated representation vectors for existing three-dimensional models. In some embodiments, the representation vector can be used to determine a similarity between one or more three-dimensional models and a separate three-dimensional model being generated, for example by a user of the computing device, in substantially real-time such that the representation vector is continuously updated based on a snapshot or rendering of the separate three-dimensional model. The representation vector can otherwise be used to determine a similarity between at least two images and/or three-dimensional models.

The hybrid machine-learning model can be used for various applications. In one particular example, a user of a computing device inputs an image of a household item, such as a kitchen sink, into the hybrid machine-learning model. The user may desire to find an existing three-dimensional model of the household item. The hybrid machine-learning model can generate a representation vector for the image of the household item, and the hybrid machine-learning model can output the representation vector for facilitating a query for identifying a corresponding three-dimensional model. The computing device can generate the query using the representation vector and can transmit the query to a database of existing three-dimensional models to search for three-dimensional models similar or otherwise corresponding to the image of the household item. In some embodiments, the existing three-dimensional models may each include a corresponding representation vector, so the computing device may compare the representation vector of the image to each representation vector of the existing three-dimensional models. The computing device can determine similarity scores (e.g., vector distances, Euclidean distances, or the like) between the representation vector and each representation vector, and the computing device can output (e.g., to a display device) one or more three-dimensional models (e.g., digital representations of the one or more three-dimensional models) that are the most similar to the image of the household item. In some embodiments, the output of one or more three-dimensional models that are most similar to the image of the household item are characterized by a representation vector with a higher similarity score than representation vectors of three-dimensional models not output by the computing device. The computing device can provide the user with the output of one or more three-dimensional models.

In some embodiments, the hybrid machine-learning model is used to facilitate tagging three-dimensional models, any components thereof, or a combination thereof. The hybrid machine-learning model, or the computing device executing the hybrid machine-learning model, can generate a set of two-dimensional objects based on the subcomponents of an input three-dimensional model. The computing device uses the hybrid machine-learning model to tag one or more of the subcomponents of the three-dimensional model and/or the three-dimensional model itself. For one or more, or each, of the two-dimensional objects, the hybrid machine-learning model applies at least one two-dimensional transformation. For example, the hybrid machine-learning model can perform a mirroring transformation, an affine transformation, an edge detector filter, and the like on one or more of the two-dimensional objects. Upon applying the at least one two-dimensional transformation to the one or more two-dimensional objects, the hybrid machine-learning model determines a representation vector for each of the two-dimensional objects such that the hybrid machine-learning model generates a set of representation vectors for the one or more two-dimensional objects. The set of representation vectors can be used to search for three-dimensional models similar to the one or more two-dimensional objects. The similar three-dimensional models may be stored in a generic public database of three-dimensional objects, a private database of three-dimensional objects, a public or private database of specific elements (e.g., parts of a house, components of an airplane, etc.), a public or private database of elements of the input three-dimensional model, or the like. An identified three-dimensional model may be considered similar or identical to the input three-dimensional model based on a similarity score between at least one representation vector of the set of representation vectors and a different representation vector determined or predetermined for the identified three-dimensional model. Based on the search results, a tag, a category, a family, or other suitable classification object can be extracted and applied to one or more of the two-dimensional objects, the input three-dimensional object, etc. Additionally, similar objects and/or models can be grouped under similar or identical classification objects.

In some embodiments, the hybrid machine-learning model is used to search for three-dimensional models based on a selected portion of a rendered three-dimensional model. A computing device can be used to render a three-dimensional model that includes a set of three-dimensional objects. A user may provide input for selecting a three-dimensional object. For example, the user may rotate or otherwise arrange a point-of-view of the three-dimensional model to cause the three-dimensional object to be displayed via the computing device. Additionally, the user may provide input, for example a mouse-click, a box dragged around the object, etc., for selecting the three-dimensional object. In response to receiving input selecting the three-dimensional object, the computing device executes the hybrid machine-learning model. For example, the computing device may generate a two-dimensional rendering of the selected three-dimensional model and may input the two-dimensional rendering into the hybrid machine-learning model. Based on the two-dimensional rendering, the hybrid machine-learning model generates a representation vector that represents the two-dimensional rendering of the selected three-dimensional object, and the computing device can use the representation vector to search for three-dimensional models that may be similar or identical to the selected three-dimensional object. The three-dimensional models may be stored in public or private databases accessible via or by the computing device. The computing device can identify a set of three-dimensional models of the searched three-dimensional models most similar to the selected three-dimensional object, and the computing device can provide, for example via output on a user interface presenting the rendered three-dimensional model, the set of three-dimensional models. In some embodiments, the user may select one or more three-dimensional models of the set of three-dimensional models, and the computing device can, in response to receiving such input, generate a rendering of the respective three-dimensional model of the set of three-dimensional models.

In some embodiments, the hybrid machine-learning model can be used to facilitate generation of a three-dimensional model based on rough input provided by a user. The rough input may include a sketch, doodle, or other simple, two-dimensional input. For example, the user may provide the rough input to a computing device by sketching (e.g., via a stylus, a finger on a touch screen, a computer mouse, etc.) a bare outline of a tree or other similar input. The computing device receives the rough input and executes the hybrid machine-learning model to generate the three-dimensional model of a tree most similar to the rough input. The computing device can extract the rough input as a two-dimensional object and can input the two-dimensional object into the hybrid machine-learning model, which can generate a representation vector based on the two-dimensional object that represents the rough input. The computing device can receive the representation vector from the hybrid machine-learning model and conducts a search, for example in various public and private databases that include one or more three-dimensional models, for the three-dimensional model. The computing device can identify a three-dimensional model most similar to the rough input based on a highest similarity score or lowest distance between the representation vector and a different representation vector of the three-dimensional model, which may resemble a tree. The computing device can automatically, or in response to confirmation input, insert the three-dimensional model in place of the rough input.

In some embodiments, the hybrid machine-learning model is configured to synchronize and/or match photographs and three-dimensional models. For example, the user may input one or more photographs into the computing device, or the computing device may access one or more photographs, etc. The computing device executes the hybrid machine-learning model and inputs the one or more photographs into the hybrid machine-learning model, which can generate a set of representation vectors that correspond to the one or more photographs. The computing device can identify a set of three-dimensional models that corresponds to the one or more photographs by comparing the set of representation vectors to a different set of representation vectors of the set of three-dimensional models. Additionally, the computing device determines, for example for each three-dimensional model of the set of three-dimensional models, a photograph that best represents each three-dimensional model. The computing device can make this determination by identifying the photograph with a representation vector closest or identical to the representation vector of each three-dimensional model. In response to the comparison, the computing device can assign or otherwise associate the respective photograph with the respective three-dimensional model such that the photograph can be stored being indicated as a representative two-dimensional object of the three-dimensional model.

The hybrid machine-learning model improves the functioning of a computing device and improves at least one technical field. By converting a two-dimensional image to a representation vector, the hybrid machine-learning model reduces an amount of computing resources (e.g., computer memory, computer processing power and/or processing time, and the like) required to search for images and/or models. For example, instead of comparing a similarity of each pixel of a two-dimensional image to each pixel of multiple (or even infinitely many) snapshots of each of a set of three-dimensional models, the hybrid machine-learning model generates a representation vector that can be used to compare the two-dimensional image to each of the set of three-dimensional models, which is much less computing-intensive than the pixel comparison. Additionally, at least the technical field of image searching is improved using the hybrid machine-learning model, though other technical fields can be improved using the hybrid machine-learning model. For example, searching for images or three-dimensional models using words or other text-based terms is difficult since content creators may use different terms (or even different languages) to describe created content (e.g., images and/or three-dimensional models) than users that want to consume the created content. The hybrid machine-learning model obviates the need to describe the created content with text-based terms since the hybrid machine-learning model generates a representation vector for content, and the representation vector can be used instead of text-based terms to search for the created content. Thus, by generating the representation vector, the hybrid machine-learning model improves at least the technical field of image searching.

The following illustrative examples are presented to introduce the reader to the general subject matter discussed herein and are not intended to limit the scope of the disclosed concepts. The following sections describe various additional features and examples with reference to the drawings in which like numerals indicate like elements and directional descriptions are used to describe the illustrative aspects but, like the illustrative aspects, should not be used to limit the present disclosure. Additionally, the presented figures are generally described with respect to computer modeling operations, but the general subject matter discussed herein is not limited to computer modeling operations.

Figure 1:
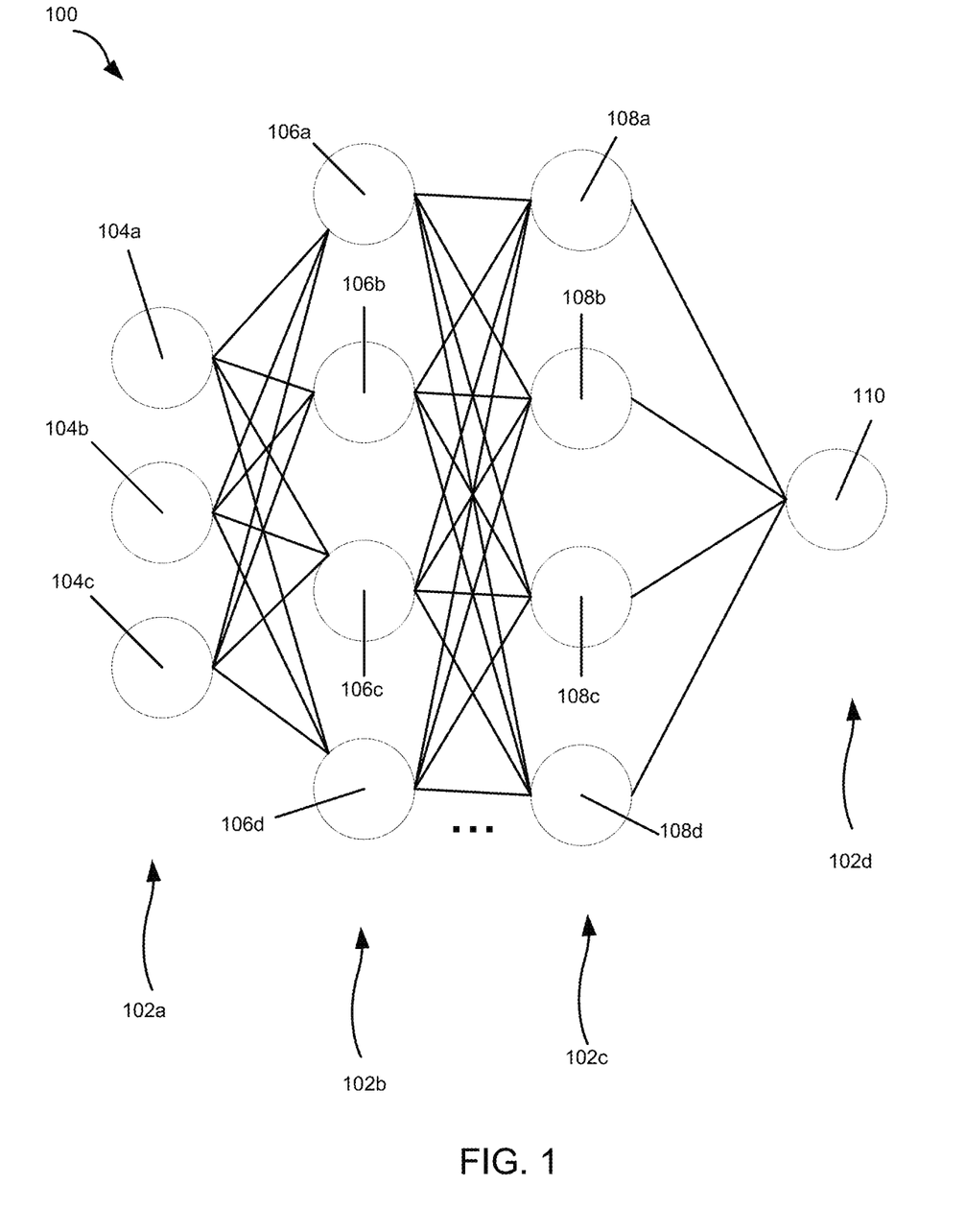
FIG. 1 depicts an architecture of an embodiment of a hybrid machine-learning model for generating a representation vector for images and/or models.

Referring first to FIG. 1, an architecture of an embodiment of a hybrid machine-learning model 100 for generating a representation vector for images and/or models is depicted. As illustrated, the hybrid machine-learning model 100 includes four layers, though any other suitable number (e.g., less than four and/or more than four) of machine-learning layers can be included in the hybrid machine-learning model 100. Additionally, the hybrid machine-learning model 100 can include a combination of supervised layers, which are trained using supervised training techniques, and unsupervised layers that are trained using unsupervised training techniques.

The hybrid machine-learning model 100 can include layers 102*a-d* and/or any other suitable machine-learning layers for generating the representation vector. The layer 102*a* can be or include an ingestion layer, the layers 102*b* can be or include one or more first hidden layers, the layers 102*c* can be or include one or more second hidden layers, and the layer 102*d* can be or include an output layer. The ingestion layer 102*a* can ingest an input image or input image data into the hybrid machine-learning model 100. For example, the ingestion layer 102*a* can receive input that includes image data for a two-dimensional image, a two-dimensional snapshot or rendering of a three-dimensional model, or the like and can ingest various attributes from the input. Three attributes 104*a-c* are illustrated as being ingested into the hybrid machine-learning model 100, but other suitable numbers (e.g., less than three or more than three) attributes can be ingested into the hybrid machine-learning model 100 via the ingestion layer 102*a*.

The hybrid machine-learning model 100 can map the attributes 104*a-c* to features 106*a-d* via the first hidden layers 102*b*. As illustrated, the hybrid machine-learning model 100 maps the three attributes 104*a-c* to four features 106*a-d*, though any other suitable numbers (e.g., less than four or more than four) of features can be included in or generated by the first hidden layers 102*b*. The first hidden layers 102*b* can include any suitable combination of convolutional layers, pooling layers, and the like for mapping the attributes 104*a-c* to the features 106*a-d*. In one particular example, the first hidden layers 102*b* can include four convolutional layers and one pooling layer for at least indirectly mapping (e.g., each layer can map inputs to outputs, etc.) the attributes 104*a-c* to the features 106*a-d*.

The hybrid machine-learning model 100 can map the features 106*a-d* to the features 108*a-d* via the second hidden layers 102*c*. As illustrated, the hybrid machine-learning model 100 maps the four features 106*a-d* to four features 108*a-d*, though any other suitable numbers (e.g., less than four or more than four) of features can be included in or generated by the second hidden layers 102*c*. The second hidden layers 102c can include any suitable combination of convolutional layers, pooling layers, and the like for mapping the features 106a-d to the features 108a-d. In one particular example, the second hidden layers 102c can include four convolutional layers and one pooling layer for at least indirectly mapping (e.g., each layer can map inputs to outputs, etc.) the features 106a-d to the features 108a-d. In some embodiments, the first hidden layers 102b and the second hidden layers 102c are similar or identical, though in other embodiments, the first hidden layers 102b and the second hidden layers 102c may not include similar or identical types or amounts of hidden layers.

In some embodiments, the ingestion layer 102a, the first hidden layers 102b, and/or the second hidden layers 102c are supervised layers such that each of these layers may be trained via supervised training techniques. Supervised training can involve inputting labeled training data into the layers and training the layers to map inputs to outputs using labels of the labeled training data. For example, training the supervised layers of the hybrid machine-learning model 100 can involve inputting labeled image data into the ingestion layer 102a, labeled attributes into the first hidden layers 102b, labeled features into the second hidden layers 102c, or the like to train each of the layers to map respective inputs to respective outputs. In some embodiments, a combination of the ingestion layer 102a, the first hidden layers 102b, and the second hidden layers 102c may be similar to an image classification convolutional neural network (IC-CNN) such that first features generated by the hybrid machine-learning model 100 may be similar or identical to second features generated by the IC-CNN and may be generated using similar or identical techniques as techniques used by the IC-CNN. But, the hybrid machine-learning model 100 post-processes or otherwise uses the generated features differently than the IC-CNN.

The hybrid machine-learning model 100 can generate a representation vector by mapping the features 108a-d into multiple dimensions using the output layer 102d. For example, the hybrid machine-learning model 100 can use the output layer 102d to convert the features 108a-d into N numerical representations of the features 108a-d. The N numerical representations can be concatenated or otherwise combined to generate an output 110 that can include the representation vector. The output layer 102d may be trained using unsupervised training techniques. For example, the output layer 102d may be trained using one or more training data sets that do not include labels. In one particular example, the output layer 102d is trained using an unlabeled training data set that includes features from input image data and output representation vector values. Thus, the hybrid machine-learning model 100 uses supervised layers to generate features based on input image data and uses unsupervised layers to transform the generated features into N dimensions to generate the representation vector. The representation vector can be output to facilitate searching for three-dimensional models, two-dimensional images, and the like.

Figure 2:
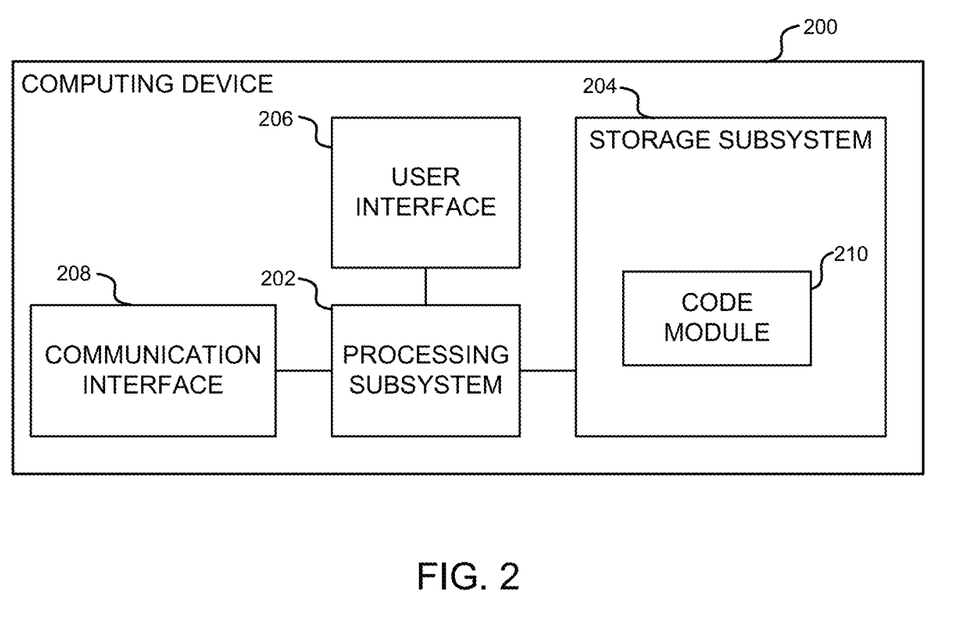
FIG. 2 depicts a block diagram of an embodiment of a computer system.

FIG. 2 is a simplified block diagram of a computing device 200 that can implement at least the hybrid machine-learning model 100. The computing device 200 can implement some or all functions, behaviors, and/or capabilities described herein that would use electronic storage or processing, as well as other functions, behaviors, or capabilities not expressly described. The computing device 200 includes a processing subsystem 202, a storage subsystem 204, a user interface 206, and/or a communication interface 208. The computing device 200 can also include other components (not explicitly shown) such as a battery, power controllers, and other components operable to provide various enhanced capabilities. In some embodiments, the computing device 200 can be implemented in a desktop computer, a laptop computer, a mobile device (e.g., tablet computer, smart phone, mobile phone), a wearable device, a media device, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform a function or combination of functions described above, and the like.

The storage subsystem 204 can be implemented using a local storage and/or removable storage medium, such as using disk, flash memory (e.g., secure digital card, universal serial bus flash drive), or any other non-transitory storage medium, or a combination of media, and can include volatile and/or non-volatile storage media. Local storage can include random access memory (RAM), including dynamic RAM (DRAM), static RAM (SRAM), or battery backed-up RAM. In some embodiments, the storage subsystem 204 can store one or more applications and/or operating system programs to be executed by the processing subsystem 202, including programs to implement some or all operations described above that would be performed using a computer. For example, the storage subsystem 204 can store one or more code modules 210 for implementing one or more method steps described herein.

A firmware and/or software implementation may be implemented with modules such as procedures, functions, and so on. A machine-readable medium tangibly embodying instructions may be used in implementing methodologies described herein. The code modules 210, such as instructions stored in memory, may be implemented within a processor or external to the processor. As used herein, the term "memory" refers to a type of long term, short term, volatile, nonvolatile, or other suitable storage medium and is not to be limited to any particular type of memory or number of memories or type of media upon which memory is stored. Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine-readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine readable medium such as a storage medium. A code segment, such as the code modules 210, or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc., may be passed, forwarded, or transmitted by suitable means including memory sharing, message passing, token passing, network transmission, etc.

Implementation of the techniques, blocks, steps, and means described herein may be done in various ways. For example, the techniques, blocks, steps, and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module 210 may include sets of instructions or codes embodied on a computer-readable medium that directs a processor of the computing device 200 to perform corresponding actions. The instructions may be configured to run in sequential order, in parallel, such as under different processing threads, or in a combination thereof. After loading a code module 210 on a general-purpose computer system, the general-purpose computer is transformed into a special-purpose computer system.

Computer programs incorporating various features described herein, such as in one or more of the code modules 210, may be encoded and stored on various computer readable storage media. Computer readable media encoded with the program code may be packaged with a compatible electronic device, or the program code may be provided separately from electronic devices such as via Internet download or as a separately packaged computer-readable storage medium, etc. The storage subsystem 204 can additionally store information useful for establishing network connections using the communication interface 208.

The user interface 206 can include input devices (e.g., touch pad, touch screen, scroll wheel, click wheel, dial, button, switch, keypad, microphone, etc.), as well as output devices (e.g., video screen, indicator lights, speakers, headphone jacks, virtual- or augmented-reality display, etc.), together with supporting electronics such as digital-to-analog or analog-to-digital converters, signal processors, etc. A user can operate input devices of the user interface 206 to invoke the functionality of the computing device 200 and can view and/or hear output from the computing device 200 via output devices of the user interface 206. For some embodiments, the user interface 206 might not be present such as for a process using an ASIC.

The processing subsystem 202 can be implemented as one or more processors such as integrated circuits, one or more single-core or multi-core microprocessors, microcontrollers, central processing unit, graphics processing unit, etc. In operation, the processing subsystem 202 can control operation of the computing device 200. In some embodiments, the processing subsystem 202 can execute a variety of programs in response to program code and can maintain multiple concurrently executing programs or processes. At a given time, some or all of a program code to be executed can reside in the processing subsystem 202 and/or in storage media, such as the storage subsystem 204. Through programming, the processing subsystem 202 can provide various functionality for the computing device 200. The processing subsystem 202 can also execute other programs to control other functions of the computing device 200, including programs that may be stored in the storage subsystem 204.

The communication interface 208 can provide voice and/or data communication capability for the computing device 200. In some embodiments, the communication interface 208 can include radio frequency (RF) transceiver components for accessing wireless data networks (e.g., Wi-Fi network; 3G, 4G/LTE, 5G; etc.), mobile communication technologies, components for short-range wireless communication (e.g., using Bluetooth communication standards, NFC, etc.), other components, or combinations of technologies. In some embodiments, the communication interface 208 can provide wired connectivity, such as universal serial bus, Ethernet, universal asynchronous receiver/transmitter, etc., in addition to, or in lieu of, a wireless interface. The communication interface 208 can be implemented using a combination of hardware (e.g., driver circuits, antennas, modulators/demodulators, encoders/decoders, and other analog and/or digital signal processing circuits) and software components. In some embodiments, the communication interface 208 can support multiple communication channels concurrently. In some embodiments, the communication interface 208 is not used.

It will be appreciated that the computing device 200 is illustrative and that variations and modifications are possible. The computing device 200 can have various functionality not specifically described, such as voice communication via cellular telephone networks, etc., and can include components appropriate to such functionality. Further, while the computing device 700 is described with reference to particular blocks, it is to be understood that these blocks are defined for convenience of description and are not intended to imply a particular physical arrangement of component parts. For example, the processing subsystem 202, the storage subsystem 204, the user interface 206, and/or the communication interface 208 can be in one device or distributed among multiple devices. Further, the blocks need not correspond to physically distinct components. Blocks can be configured to perform various operations, for example by programming a processor or providing appropriate control circuitry, and various blocks might or might not be reconfigurable depending on how an initial configuration is obtained. Embodiments of the present invention can be realized in a variety of apparatuses including electronic devices implemented using a combination of circuitry and software. Electronic devices described herein can be implemented using the computing device 200.

Figure 3:
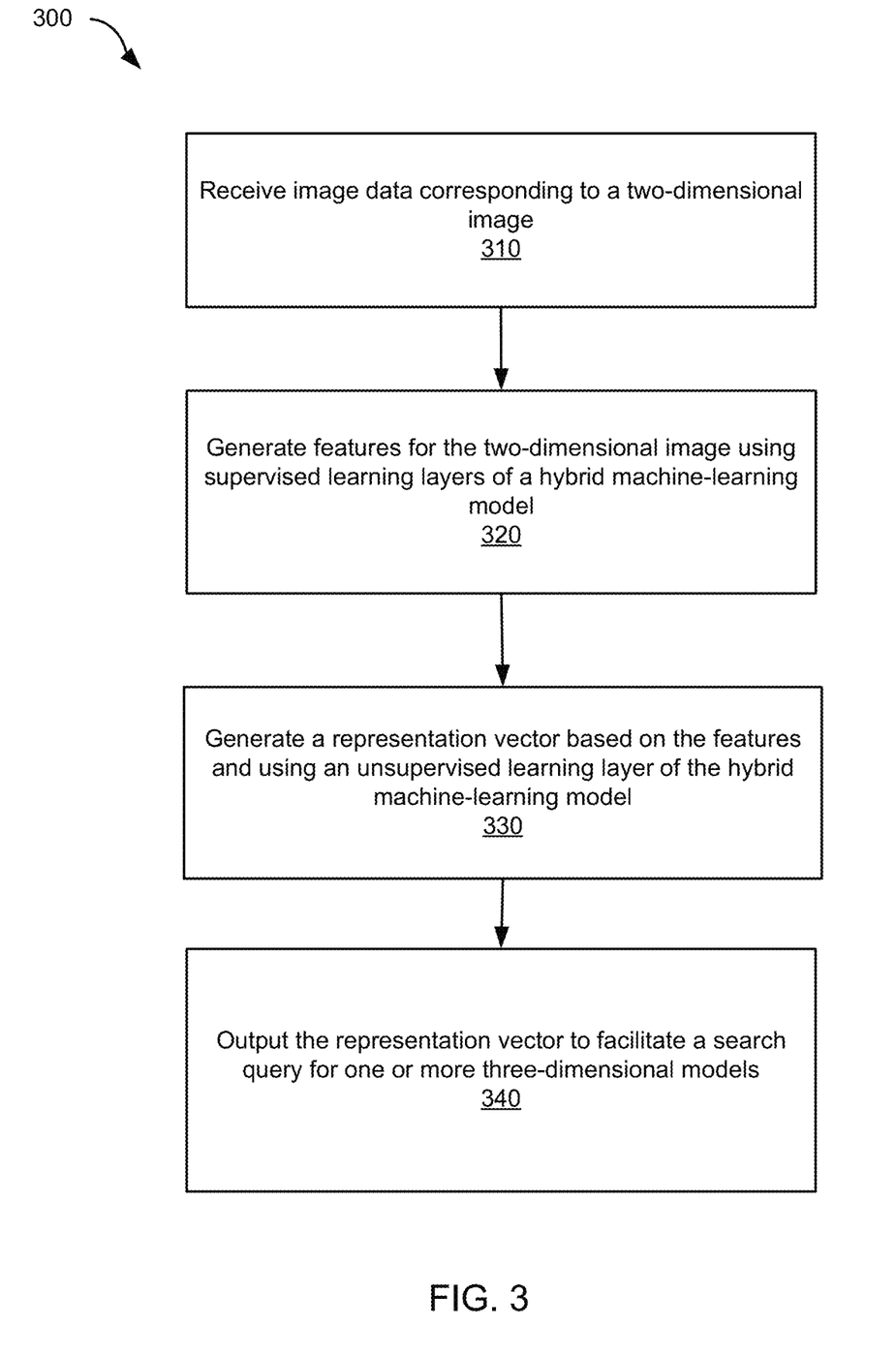
FIG. 3 depicts an embodiment of a process for generating a representation vector that represents a two-dimensional image for facilitating a search for a three-dimensional model.

In FIG. 3, a flowchart of an embodiment of a process 300 for generating a representation vector that represents a two-dimensional image for facilitating a search for a three-dimensional model is illustrated. In some embodiments, the process 300 can be performed by the computing device 200 and/or any other suitable computing device. The operations of the process 300 are described in a particular order, but the operations of the process 300 can be performed in any other suitable order including substantially contemporaneously.

One purpose of process 300 can include generating a representation vector for an image desired to be used in searching for a three-dimensional model corresponding to the image, though the process 300 can be used for any other suitable purposes.

Receiving Image Data

The process 300 begins at block 310 with receiving image data corresponding to a two-dimensional image. The computing device 200 can receive the image data from user input, for example via a user interface or the like provide by the computing device 200. In some embodiments, the computing device 200 can receive the two-dimensional image via user input and can extract the image data from the two-dimensional image. Additionally or alternatively, the two-dimensional image may be or include a two-dimensional snapshot of a three-dimensional image, a link to a network location storing a two-dimensional image or snapshot of a three-dimensional model, an edge-detected two-dimensional drawing input by a user, or the like.

Generating Features Based on the Image Data

At block 320, features are generated for the two-dimensional image. The computing device 200 can use a subset of the hybrid machine-learning model 100 to generate the features. For example, the computing device 200 can use the supervised layers (e.g., the layers 102a-c) to generate features corresponding to the two-dimensional image and based on the received image data. The hybrid machine-learning model 100 can include any suitable number of convolutional layers, pooling layers, and the like to generate the features based on the input image data. For example, the hybrid machine-learning model 100 can extract attributes from the input image data and can map the attributes to the features using one or more convolutional layers and, optionally, one or more pooling layers. The features can include features of the two-dimensional image to which the input image data corresponds.

Generating a Representation Vector

At block 330, a representation vector is generated based on the features. The computing device 200 can use a subset of the hybrid machine-learning model 100 to generate the representation vector. For example, the computing device 200 can use the unsupervised layers (e.g., the layer 102d) to generate the representation vector corresponding to the two-dimensional image and based on the generated features. Instead of a prediction layer, which is common among image classification neural networks, the hybrid machine-learning model 100 may include and use an unsupervised layer, such as the output layer 102d, to transform the features into N dimensions, where N can be any suitable number (e.g., from one to 100,000 or more). In some embodiments, the output layer 102d performs one or more mathematical operations on the generated features to generate N numerical representations corresponding to the features, thus projecting the features into N dimensions. The hybrid machine-learning model 100 can concatenate or otherwise combine the N numerical representations corresponding to the features to generate the representation vector. In some embodiments, the representation vector includes an N×1 matrix, where each row corresponds to a different numerical representation of the N numerical representations of the features. In some embodiments, multiple representation vectors may be combined, concatenated, or otherwise manipulated to generate a representation vector. For example, a mean vector may be generated from multiple representation vectors.

Outputting the Representation Vector

At block 340, the representation vector is output for facilitating one or more queries. For example, the computing device 200 can output the representation vector for generating and submitting a model-search query that searches for a three-dimensional model that corresponds most closely to the two-dimensional image. In some embodiments, the computing device 200 can generate the model-search query using the representation vector. The model-search query can involve instructions to determine a similarity score between the representation vector and one or more other representation vectors that represent corresponding one or more three-dimensional models or two-dimensional snapshots thereof. Executing the model-search query may involve accessing the one or more other representation vectors and comparing each of these representation vectors to the representation vector to determine a most-similar representation vector with respect to the representation vector of the two-dimensional image. Additionally or alternatively, executing the model-search query can cause the computing device 200 to receive and output a three-dimensional model represented by a representation vector most similar to the representation vector determined at the block 330.

Figure 4:
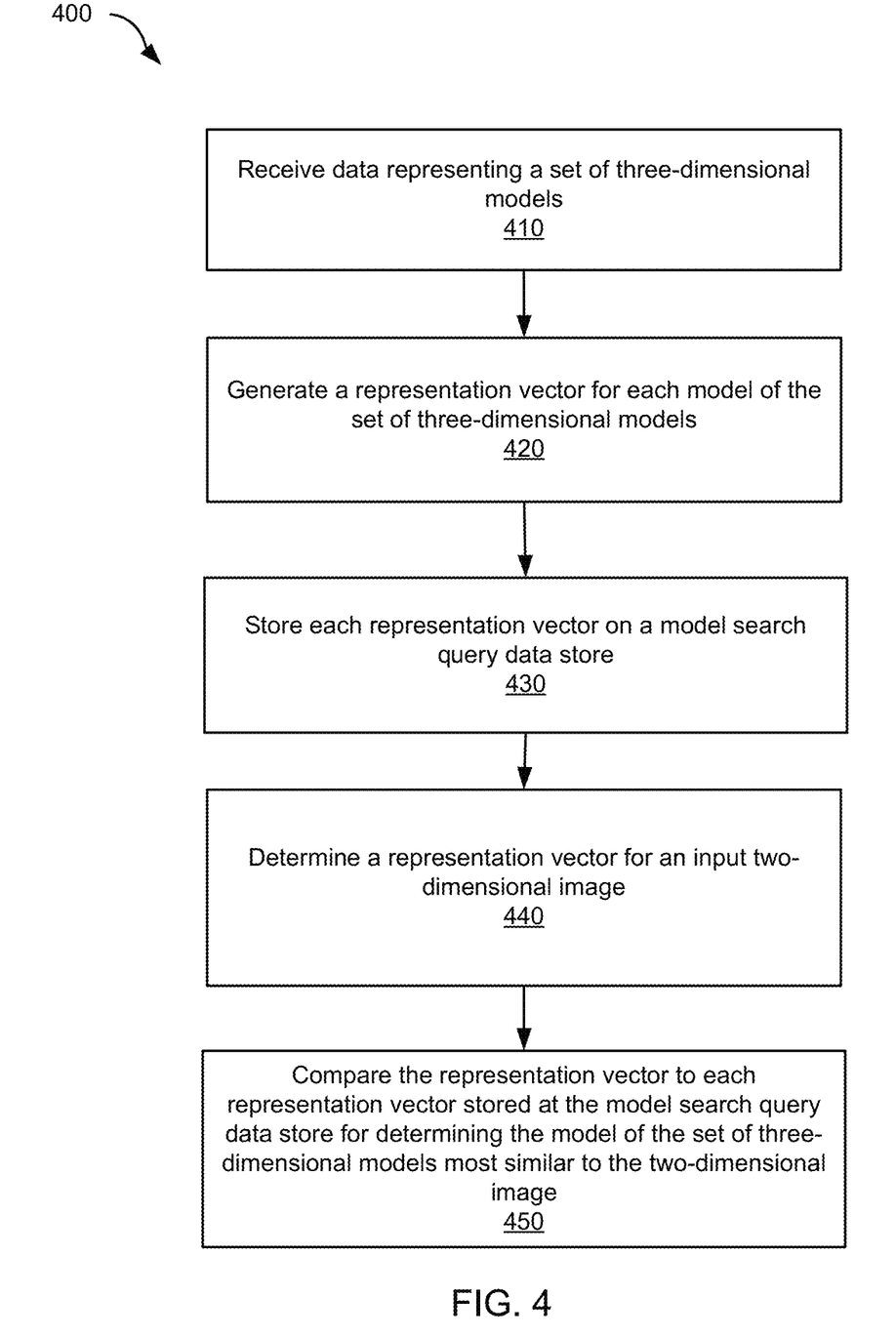
FIG. 4 depicts an embodiment of a process for generating representation vectors for a set of three-dimensional models and querying the set of three-dimensional models using a representation vector of a two-dimensional image.

In FIG. 4, a flowchart of an embodiment of a process 400 for generating representation vectors for a set of three-dimensional models and querying the set of three-dimensional models using a representation vector of a two-dimensional image is illustrated. In some embodiments, the process 400 can be performed by the computing device 200 and/or any other suitable computing device. The operations of the process 400 are described in a particular order, but the operations of the process 400 can be performed in any other suitable order including substantially contemporaneously.

One purpose of process 400 can include generating representation vectors for existing three-dimensional models to facilitate queries to identify one or more three-dimensional models that correspond to an input two-dimensional image, though the process 400 can be used for any other suitable purposes.

Receiving Data for a Set of Three-Dimensional Models

The process 400 begins at block 410 with receiving data corresponding to a set of three-dimensional models. The data may include model data that is extracted from (or has been extracted from) each three-dimensional model of the set of three-dimensional models. In some embodiments, the data includes snapshots or other suitable two-dimensional renderings of one or more three-dimensional models of the set of three-dimensional models.

The set of three-dimensional models may be included in an asset store or other suitable storage location that can store the set of three-dimensional models. For example, the set of three-dimensional models may be stored in a model library or model database that accumulates historical three-dimensional models. The model library may be associated with (e.g., provided by) a service that enables users to generate three-dimensional models or other suitable assets. In some embodiments, the computing device 200 can access the model library to receive the data corresponding to the set of three-dimensional models.

Generating Representation Vectors for Three-Dimensional Models

At block 420, representation vectors are generated for each three-dimensional model corresponding to the received data. At least one representation vector may be generated for each three-dimensional model. For example, the computing device 200 can extract image data from each three-dimensional model by generating a two-dimensional rendering of each three-dimensional model and extracting image data from the two-dimensional renderings. The computing device 200 can input each set of extracted image data corresponding to each three-dimensional model into the hybrid machine-learning model 100, and the hybrid machine-learning model 100 can generate a representation vector for each set of extracted image data. The representation vectors can be generated using techniques similar or identical to those described with respect to the process 300. Thus, each representation vector generated for each three-dimensional model may be an N-dimensional vector that includes N numerical representations of a two-dimensional rendering corresponding to each three-dimensional model.

Storing the Representation Vectors

At block 430, the generated representation vectors are stored on a model search query data store. In some embodiments, the computing device 200 can receive the generated representation vectors corresponding to the set of three-dimensional models and can store the generated representation vectors in the model library (e.g., associated with the respective three-dimensional models) or in other suitable locations that can be accessed by the computing device 200. In some embodiments, a representation vector may be received as input from a first data store and used to search in a second data store. The computing device 200 may be configured to access the stored representation vectors and may, for each stored representation vector, be configured to identify a three-dimensional model that corresponds to the representation vector.

Processing an Input Image

At block 440, a separate representation vector is generated for an input two-dimensional image. The computing device 200 may receive the input two-dimensional image via user input such as an uploaded image document, a directly generated two-dimensional sketch, a two-dimensional snapshot of an input three-dimensional image, or the like. The computing device 200 can extract image data from the input two-dimensional image and can input the extracted image data into the hybrid machine-learning model 100. The hybrid machine-learning model 100 may generate the separate representation vector using techniques similar or identical to those described with respect to the process 300. Accordingly, the hybrid machine-learning model 100 can generate the second representation vector by generating features based on the extracted image data and projecting the generated features into N dimensions. The hybrid machine-learning model 100 can concatenate the N-dimensional features into the separate representation vector, which may include N numerical representations corresponding to the input two-dimensional image.

Comparing the Separate Representation Vector to the Representation Vectors

At block 450, the separate representation vector is compared to the representation vectors of the set of three-dimensional models. The computing device 200 may generate and/or submit a query to the model library or other suitable location that stores the representation vectors of the set of three-dimensional models. The query may cause the computing device 200 to receive one or more of the representation vectors of the set of three-dimensional models. For each representation vector of the set of three-dimensional models received, the computing device 200 may compare each representation vector to the separate representation vector. In some embodiments, the comparison involves determining a vector distance, determining a Euclidean distance, or the like between each representation vector and the separate representation vector. The representation vector characterized by the smallest comparison value with respect to the separate representation vector may be identified by the computing device 200, and the computing device 200 may additionally identify the particular three-dimensional model corresponding to the representation vector. The computing device 200 can provide the particular three-dimensional model as output, for example to a user of the computing device 200 or to a different entity that submitted the two-dimensional image. In some embodiments, the computing device 200 provides (e.g., to the user or the different entity) a list of three-dimensional models. The list may be ordered ascending with respect to the comparison results such that at one end (e.g., the top of the list) is the particular three-dimensional model and each next-presented three-dimensional model includes a corresponding representation vector whose comparison value with respect to the separate representation vector is larger than that of the previous three-dimensional model.

Figure 5:
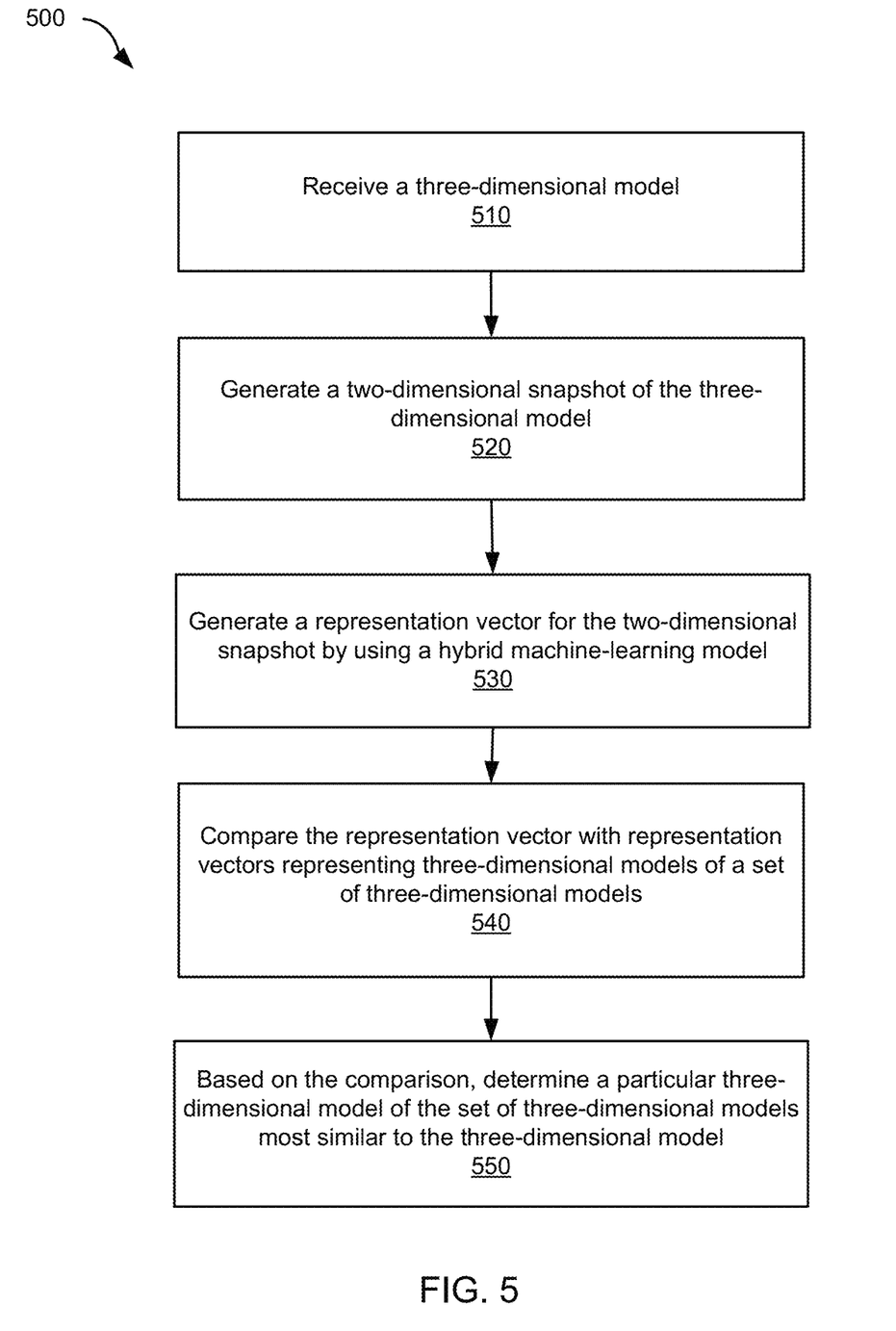
FIG. 5 depicts an embodiment of a process for generating and using, in substantially real-time, a representation vector of a two-dimensional snapshot of a three-dimensional model to query a set of three-dimensional models.

In FIG. 5, a flowchart of an embodiment of a process 500 for generating and using, in substantially real-time, a representation vector of a two-dimensional snapshot of a three-dimensional model to query a set of three-dimensional models is illustrated. In some embodiments, the process 500 can be performed by the computing device 200 and/or any other suitable computing device. The operations of the process 500 are described in a particular order, but the operations of the process 500 can be performed in any other suitable order including substantially contemporaneously.

One purpose of process 500 can include facilitating a search for a particular three-dimensional model based on substantially contemporaneous input, though the process 500 can be used for any other suitable purposes.

Receiving a Three-Dimensional Model

Process 500 begins at block 510 with receiving a three-dimensional model via user input. The three-dimensional model can be input via drag-and-drop techniques, sketching techniques, or the like. For example, a user can drag a file including the three-dimensional model from a storage location (e.g., on a personal computing device) and drop the file on a user interface presented by the computing device 200. Additionally or alternatively, the user can provide input, via the user interface, that causes a sketch or skeleton of a model to be generated. For example, the user can use a stylus, a computer mouse, or other suitable input tool to draw a subset of a desired three-dimensional model. The computing device 200 can substantially contemporaneously receive model data based on the input provided by the user. In some embodiments, the model data can include edge detections, sizes, shapes, and other suitable model parameters that can define the three-dimensional model provided via the user input.

Generating a Two-Dimensional Snapshot

At block 520, a two-dimensional snapshot of the received three-dimensional model is generated. The received three-dimensional model may be a complete or partial three-dimensional model. The computing device 200 can periodically, and substantially contemporaneously with respect to the user input, extract or generate a snapshot of the received three-dimensional model. In some embodiments, the computing device 200 generates the snapshot every two, three, four, or more seconds or generates the snapshot after each instance of receiving additional input from the user. The computing device 200 can extract image data from each snapshot and can use the extracted image to generate a representation vector.

Generating a Representation Vector for the Two-Dimensional Snapshot

At block 530, a representation vector is generated for the two-dimensional snapshot using the hybrid machine-learning model 100. The computing device 200 can extract the image data from the two-dimensional snapshot of the received three-dimensional image and can input the extracted image data into the hybrid machine-learning model 100. The hybrid machine-learning model 100 can generate features based on the extracted image data and can project the features into N numerical representations of the two-dimensional snapshot. The hybrid machine-learning model 100 can additionally concatenate or otherwise combine the N numerical representations into the representation vector and can output the representation vector, for example by providing the representation vector to the computing device 200.

Comparing the Representation Vector

At block 540, the representation vector for the two-dimensional snapshot is compared to a set of representation vectors corresponding to a set of three-dimensional models. The computing device 200, or any other suitable computing device, may have previously generated representation vectors for each three-dimensional model of the set of three-dimensional models, and the computing device 200 may access the previously generated representation vectors. The computing device 200 can compare the representation vector for the two-dimensional snapshot to each accessed representation vector for the three-dimensional models. The representation vector for the two-dimensional snapshot may be identical in dimension to each accessed representation vector for the three-dimensional models. For example, the representation vector and each accessed representation vector for the three-dimensional models may each be dimension N such that each of the vectors include N numerical representations for the respective two-dimensional image or two-dimensional snapshot. Accordingly, the computing device 200 can determine a vector distance, a Euclidean distance, or the like between the representation vector for the two-dimensional snapshot and each accessed representation vector for the three-dimensional models.

Determining a Particular Three-Dimensional Model Most Similar to the Snapshot

At block 550, based on the comparison at the block 540, the computing device 200 determines a particular three-dimensional model that is most similar to the two-dimensional snapshot. In some embodiments, the computing device 200 determines, among the comparisons performed at the block 540, the particular three-dimensional model by selecting the comparison with the lowest value. The lowest value can include the lowest vector distance, the lowest Euclidean distance, or the like. Thus, the selected particular three-dimensional model can include a three-dimensional model with a corresponding representation vector that is characterized by the shortest distance with respect to the representation vector of the two-dimensional snapshot. The computing device 200 can provide the particular three-dimensional model to the user. For example, the computing device 200 can replace any input (e.g., sketches, etc.) provided by the user with the particular three-dimensional model. In some embodiments, the computing device 200 can provide an ordered list (e.g., in ascending order of distance comparisons) of three-dimensional models such that the list includes three-dimensional models with representation vectors having the lowest distance with respect to the representation vector of the two-dimensional snapshot.

Figure 6:
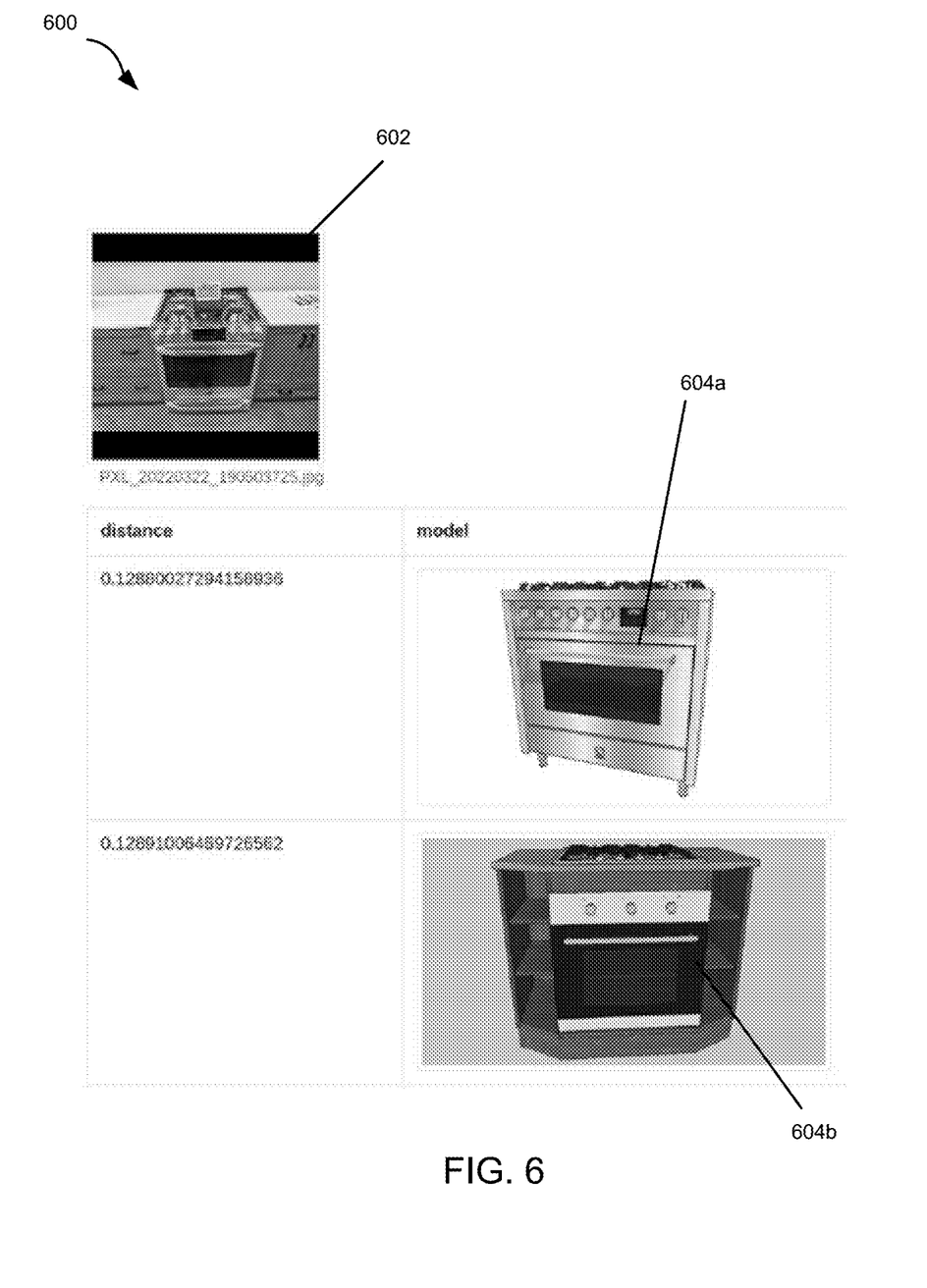
FIG. 6 depicts an embodiment of results from querying a set of three-dimensional models using a representation vector of a two-dimensional image.

In FIG. 6, an embodiment of results 600 from querying a set of three-dimensional models using a representation vector of a two-dimensional image 602 is depicted. As illustrated, the two-dimensional image 602 is an image of a range appliance, though other suitable images can be used to query the set of three-dimensional models. In some embodiments, the two-dimensional image 602 may be provided (e.g., via a user interface) to the computing device 200, and the computing device 200 can input the two-dimensional image 602, or extracted image data thereof, into the hybrid machine-learning model 100. The two-dimensional image 602 may be provided to the computing device 200 via uploading an existing file, sketching a new image, or any other suitable techniques for input.

The computing device 200 can input the two-dimensional image 602 into the hybrid machine-learning model 100, which can generate features based on the two-dimensional image 602. For example, the layers of the hybrid machine-learning model 100 trained via supervised training techniques can receive image data from the two-dimensional image 602 and can generate the features. The hybrid machine-learning model 100 can project the features into N dimensions using at least one layer trained via unsupervised training techniques, and the hybrid machine-learning model 100 can concatenate the projected features into an N-dimensional representation vector. The computing device 200 can use the representation vector to generate and submit a query for identifying at least one three-dimensional model.

The computing device 200 can generate a query that involves one or more comparisons using the representation vector. For example, the computing device 200 can submit the query to a repository of existing three-dimensional models to determine a particular three-dimensional model of the existing three-dimensional models that is most similar to the two-dimensional image 602. Each three-dimensional model, or image data from a snapshot thereof, of the existing three-dimensional models may have previously been input into the hybrid machine-learning model 100 and may each include a corresponding representation vector. Accordingly, executing the query can cause the computing device 200 to receive the representation vectors corresponding to the three-dimensional models. The computing device 200 can compare (e.g., by determining a distance between) each representation vector corresponding to the existing three-dimensional models and the representation vector corresponding to the two-dimensional image 602.

The computing device 200 can provide three-dimensional models 604*a-b* in response to comparing the representation vectors. The three-dimensional models 604*a-b* may each include a representation vector with a smaller distance from the representation vector of the two-dimensional image 602 than any other representation vector of any other existing three-dimensional model in the repository. The three-dimensional model 604*a* may be presented first (e.g., at the top of a list) since the distance between the representation vector of the three-dimensional model 604*a* and the representation vector of the two-dimensional image 602 is shorter than the distance between the representation vector of the three-dimensional model 604*b* and the representation vector of the two-dimensional image 602. The three-dimensional models 604*a-b* can otherwise suitably be presented to the user that provided the two-dimensional image 602.

Various features described herein, e.g., methods, apparatus, computer-readable media and the like, can be realized using a combination of dedicated components, programmable processors, and/or other programmable devices. Processes described herein can be implemented on the same processor or different processors. Where components are described as being configured to perform certain operations, such configuration can be accomplished, e.g., by designing electronic circuits to perform the operation, by programming programmable electronic circuits (such as microprocessors) to perform the operation, or a combination thereof. Further, while the embodiments described above may make reference to specific hardware and software components, those skilled in the art will appreciate that different combinations of hardware and/or software components may also be used and that particular operations described as being implemented in hardware might be implemented in software or vice versa.

Specific details are given in the above description to provide an understanding of the embodiments. However, it is understood that the embodiments may be practiced without these specific details. In some instances, well-known circuits, processes, algorithms, structures, and techniques may be shown without unnecessary detail in order to avoid obscuring the embodiments.

While the principles of the disclosure have been described above in connection with specific apparatus and methods, it is to be understood that this description is made only by way of example and not as limitation on the scope of the disclosure. Embodiments were chosen and described in order to explain the principles of the invention and practical applications to enable others skilled in the art to utilize the invention in various embodiments and with various modifications, as are suited to a particular use contemplated. It will be appreciated that the description is intended to cover modifications and equivalents.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary. Patents, patent applications, publications, and descriptions mentioned here are incorporated by reference in their entirety for all purposes. None is admitted to be prior art.

What is claimed is:

1. A method comprising:
   receiving, by a computing device, image data that corresponds to at least one two-dimensional image;
   generating, by the computing device and using supervised layers of a hybrid machine-learning model, features based on the image data corresponding to the at least one two-dimensional image;
   generating, by the computing device and by using an unsupervised layer of the hybrid machine-learning model, a representation vector for the at least one two-dimensional image by transforming the features into a predetermined amount of numerical representations corresponding to the features; and
   outputting, by the computing device, the representation vector for the at least one two-dimensional image to facilitate a search query for one or more three-dimensional models associated with the at least one two-dimensional image;
   wherein the hybrid machine-learning model has an architecture such that each of the supervised layers precedes the unsupervised layer and the supervised layers generate an input for the unsupervised layer, each of the supervised layers having been trained via a supervised training technique and the unsupervised layer having been trained via an unsupervised training technique.

2. The method of claim 1, further comprising:
   receiving, by the computing device, model data that includes data representing a set of three-dimensional models;
   generating, by the computing device, a set of second representation vectors, for each three-dimensional model included in the set of three-dimensional models:
      generating, by the computing device, a two-dimensional snapshot based on a particular view of the three-dimensional model;
      generating, by the computing device and using the supervised layers of the hybrid machine-learning model, features corresponding to a subset of the model data, wherein the subset corresponds to the two-dimensional snapshot; and
      generating, by the computing device and using the unsupervised layer of the hybrid machine-learning model, a second representation vector based on the features corresponding to the subset of the model data, wherein the second representation vector represents the two-dimensional snapshot; and
   storing each second representation vector of the set of second representation vectors in a model query data store.

3. The method of claim 2, wherein:
   receiving the image data comprises receiving, by the computing device, a model search query that indicates that an entity is searching for a three-dimensional model based on the at least one two-dimensional image; and
   outputting the representation vector comprises comparing, by the computing device and in response to receiving the model search query, the representation vector to each second representation vector of the set of second representation vectors stored in the model query data store.

4. The method of claim 3, further comprising:
   determining, by the computing device and based on comparing the representation vector to each second representation vector, that a particular second representation vector of the set of second representation vectors is most similar to the representation vector; and
   outputting, by the computing device, a particular three-dimensional model of the one or more three-dimensional models, wherein the particular second representation vector corresponds to the particular three-dimensional model.

5. The method of claim 1, wherein receiving the image data includes:
   receiving, by the computing device, a three-dimensional model; and
   generating, by the computing device, the at least one two-dimensional image based on the three-dimensional model.

6. The method of claim 5, wherein generating the at least one two-dimensional image comprises generating, by the computing device, the at least one two-dimensional image by extracting the image data from a two-dimensional snapshot of the three-dimensional model.

7. The method of claim 6, further comprising:
   determining, by the computing device and based on comparing the representation vector to each second representation vector of a set of second representation vectors corresponding to the one or more three-dimensional models, that a particular second representation vector of the set of second representation vectors is most similar to the representation vector; and
   outputting, by the computing device, a particular three-dimensional model of the one or more three-dimensional models, wherein the particular second representation vector corresponds to the particular three-dimensional model.

8. The method of claim 7, wherein generating the at least one two-dimensional image, determining that the particular second representation vector of the set of second representation vectors is most similar to the representation vector, and outputting the particular three-dimensional model are performed substantially contemporaneously.

9. A system comprising:
   a processing device; and
   a non-transitory computer-readable medium comprising instructions executable by the processing device to cause the processing device to perform operations comprising:

receiving image data that corresponds to at least one two-dimensional image;

generating, using supervised layers of a hybrid machine-learning model, features based on the image data corresponding to the at least one two-dimensional image;

generating, by using an unsupervised layer of the hybrid machine-learning model, a representation vector for the at least one two-dimensional image by transforming the features into a predetermined amount of numerical representations corresponding to the features; and outputting the representation vector for the at least one two-dimensional image to facilitate a search query for one or more three-dimensional models associated with the at least one two-dimensional image;

wherein the hybrid machine-learning model has an architecture such that each of the supervised layers precedes the unsupervised layer and the supervised layers generate an input for the unsupervised layer, each of the supervised layers having been trained via a supervised training technique and the unsupervised layer having been trained via an unsupervised training technique.

10. The system of claim 9, wherein the operation of receiving the image data includes:
receiving a three-dimensional model; and
generating the at least one two-dimensional image based on the three-dimensional model.

11. The system of claim 10, wherein the operation of generating the at least one two-dimensional image comprises generating the at least one two-dimensional image by extracting the image data from a two-dimensional snapshot of the three-dimensional model.

12. The system of claim 11, wherein:
the operation of receiving the image data comprises receiving a model search query that indicates that an entity is searching for the three-dimensional model; and
the operation of outputting the representation vector comprises comparing, in response to receiving the model search query, the representation vector to each second representation vector of a set of second representation vectors corresponding to a set of three-dimensional models.

13. The system of claim 12, further comprising:
receiving model data that includes the set of three-dimensional models;
generating the set of second representation vectors by, for each three-dimensional model included in the set of three-dimensional models:
  generating a two-dimensional image based on a particular view of the three-dimensional model;
  generating, using the supervised layers of the hybrid machine-learning model, features corresponding to a subset of the model data corresponding to the two-dimensional image; and
  generating, using the unsupervised layer of the hybrid machine-learning model, a second corresponding representation vector based on the features corresponding to the subset of the model data, wherein the second corresponding representation vector represents the two-dimensional image; and
storing each second representation vector of the set of second representation vectors in a model query data store.

14. The system of claim 13, wherein the operations further comprise:

determining, based on comparing the representation vector to each second representation vector of the set of second representation vectors, that a particular second representation vector of the set of second representation vectors is most similar to the representation vector; and outputting a particular three-dimensional model of the one or more three-dimensional models, wherein the particular second representation vector corresponds to the particular three-dimensional model; and wherein the operation of generating the at least one two-dimensional image, the operation of determining that the particular second representation vector of the set of second representation vectors is most similar to the representation vector, and the operation of outputting the particular three-dimensional model are performed substantially contemporaneously.

15. A non-transitory computer-readable medium comprising instructions executable by a processing device to cause the processing device to perform operations comprising:
receiving image data that corresponds to at least one two-dimensional image;

generating, using supervised layers of a hybrid machine-learning model, features based on the image data corresponding to the at least one two-dimensional image;

generating, by using an unsupervised layer of the hybrid machine-learning model, a representation vector for the at least one two-dimensional image by transforming the features into a predetermined amount of numerical representations corresponding to the features; and outputting the representation vector for the at least one two-dimensional image to facilitate a search query for one or more three-dimensional models associated with the at least one two-dimensional image;

wherein the hybrid machine-learning model has an architecture such that each of the supervised layers precedes the unsupervised layer and the supervised layers generate an input for the unsupervised layer, each of the supervised layers having been trained via a supervised training technique and the unsupervised layer having been trained via an unsupervised training technique.

16. The non-transitory computer-readable medium of claim 15, wherein the operations further comprise:
receiving model data that includes data representing a set of three-dimensional models;
generating a set of second representation vectors by, for each three-dimensional model included in the set of three-dimensional models:
  generating a two-dimensional snapshot based on a particular view of the three-dimensional model;
  generating, using the supervised layers of the hybrid machine-learning model, features corresponding to a subset of the model data, wherein the subset corresponds to the two-dimensional snapshot; and
  generating, using the unsupervised layer of the hybrid machine-learning model, a second representation vector based on the features corresponding to the subset of the model data, wherein the second representation vector represents the two-dimensional snapshot; and
storing each second representation vector of the set of second representation vectors in a model query data store.

17. The non-transitory computer-readable medium of claim 16, wherein:
the operation of receiving the image data comprises receiving a model search query that indicates that an entity is searching for a three-dimensional model based on the at least one two-dimensional image; and the operation of outputting the representation vector comprises comparing, in response to receiving the model search query, the representation vector to each second representation vector of the set of second representation vectors stored in the model query data store.

18. The non-transitory computer-readable medium of claim 17, wherein the operations further comprise:
   determining, based on comparing the representation vector to each second representation vector, that a particular second representation vector of the set of second representation vectors is most similar to the representation vector; and
   outputting a particular three-dimensional model of the one or more three-dimensional models, wherein the particular second representation vector corresponds to the particular three-dimensional model.

19. The non-transitory computer-readable medium of claim 15, wherein the operation of receiving the image data includes:
   receiving a three-dimensional model; and
   generating the at least one two-dimensional image based on the three-dimensional model.

20. The non-transitory computer-readable medium of claim 15, wherein the operation of generating the at least one two-dimensional image comprises generating the at least one two-dimensional image by extracting the image data from a two-dimensional rendering of a three-dimensional model, and wherein the operations further comprise:
   determining, based on comparing the representation vector to each second representation vector of a set of second representation vectors corresponding to the one or more three-dimensional models, that a particular second representation vector of the set of second representation vectors is most similar to the representation vector; and
   outputting a particular three-dimensional model of the one or more three-dimensional models, wherein the particular second representation vector corresponds to the particular three-dimensional model.

* * * * *